(12) United States Patent
Chilukoor

(10) Patent No.: US 7,606,151 B2
(45) Date of Patent: Oct. 20, 2009

(54) POWER REDUCTION IN SWITCH ARCHITECTURES

(75) Inventor: Murali S Chilukoor, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 602 days.

(21) Appl. No.: 10/547,143

(22) PCT Filed: Apr. 21, 2005

(86) PCT No.: PCT/IB2005/001093

§ 371 (c)(1),
(2), (4) Date: Aug. 24, 2005

(87) PCT Pub. No.: WO2006/111787

PCT Pub. Date: Oct. 26, 2006

(65) Prior Publication Data

US 2007/0159970 A1    Jul. 12, 2007

(51) Int. Cl.
*H04L 12/26* (2006.01)

(52) U.S. Cl. ..................... 370/230; 370/252

(58) Field of Classification Search .............. None
See application file for complete search history.

(56) References Cited

U.S. PATENT DOCUMENTS

| | | | |
|---|---|---|---|
| 5,940,785 A | 8/1999 | Georgiou et al. | |
| 7,392,411 B2 * | 6/2008 | Shakkarwar | ................ 713/320 |
| 2002/0120878 A1 | 8/2002 | Lapidus | |
| 2003/0115428 A1 * | 6/2003 | Zaccarin et al. | ............. 711/156 |
| 2003/0221026 A1 | 11/2003 | Newman | |

FOREIGN PATENT DOCUMENTS

WO    2006/111787    10/2006

OTHER PUBLICATIONS

"Search Report and Written Opinion" for PCT/IB2005/001093 mailed Nov. 14, 2005, 16 pgs.

"802.3 IEEE Standard for Information Technology, Table of Contents", *Telecommunications and information exchange between systems-Local and metropolitan area networks-Specific Requirements*, Part 3: Carrier sense multiple access with collision detection (CSMA/CD) access method and physical layer specifications,(Mar. 8, 2002), 11 pgs.

"The ATM Forum Technical Committee", ATM-MPLS Network Interworking, Version 1.0, GTPP Standard #24,(Aug. 2001), 23 Pgs.

(Continued)

*Primary Examiner*—Frank Duong
(74) *Attorney, Agent, or Firm*—Grossman, Tucker, Perreault & Pfleger, PLLC

(57) ABSTRACT

A method according to one embodiment may include receiving, by an integrated circuit of a switch, a plurality of packets, monitoring a rate of the plurality of packets received at the integrated circuit, and adjusting a power consumption of at least a part of the integrated circuit in response to the rate of the plurality of packets received at the integrated circuit. A switch may include a plurality of ports configured to receive a plurality of packets, and an integrated circuit configured to monitor a rate of the plurality of packets received at the switch. The integrated circuit may be configured to adjust a power consumption of at least part of the switch in response to the rate of the plurality of packets received at the switch.

17 Claims, 5 Drawing Sheets

OTHER PUBLICATIONS

International Preliminary Report on Patentability for PCT Application No. PCT/IB2005/001093, mailed on Oct. 23, 2007, 10 Pgs.

Office Action received for EP Patent Application No. 05733989.7-1249 mailed Apr. 22, 2009; 8 pages.

* cited by examiner

POWER REDUCTION IN SWITCH ARCHITECTURES

CROSS-REFERENCE TO RELATED APPLICATION

This application claims priority to International Application Serial Number PCT/IB2005/001093 filed Apr. 21, 2005, the specification of which is incorporated herein by reference in its entirety.

BACKGROUND

Computer nodes may communicate with each other via one or more communication networks. Each node may function as a transmitting (source) and receiving (destination) device in order to exchange data and/or commands with each other using different communication protocols. Data and/or commands may be divided by the communication protocol into smaller packets of information for more efficient routing. Each packet may have a particular format and size.

A switch may be utilized to facilitate communication within and between networks by routing packets between computer nodes. As the quantity and speed of communications increase, the throughput requirement of such switches also continues to grow. At the same time, there is a drive to reduce power consumption in switches. However, reducing power consumption can be a limiting factor on the throughput of the switch.

For instance, one conventional method of reducing the overall power consumption of the switch is to design the switch architecture for a designed header rate less than the peak header rate. Despite reduced power consumption, this conventional switch architecture cannot support traffic at a desired peak header rate. Therefore, if incoming packet traffic to the switch increased to this peak header rate, the switch may drop packets leading to degradation in switch performance. Furthermore, this conventional switch architecture is static in nature and as such lacks flexibility to take into account varying circumstances such as packet arrival rates to the switch.

DETAILED DESCRIPTION

Figure 1:
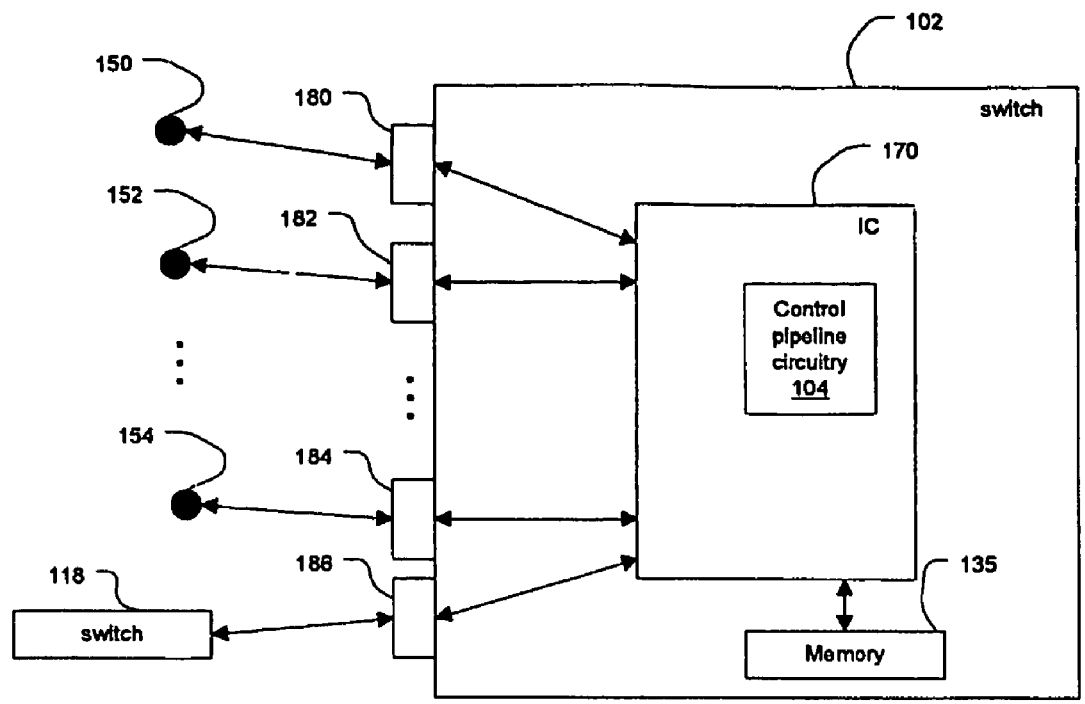
FIG. 1 is a block diagram of a switch.

FIG. 1 is a block diagram of a system including a switch 102 to facilitate communication of data and/or commands among the plurality of computer nodes 150, 152, 154. Each computer node 150, 152, 154 may include, for example, one or more personal computers and/or server systems. Computer nodes 150, 152, 154 may be coupled to ports 180, 182, 184, respectively, of the switch 102. Switch 102 and computer nodes 150, 152, 154 may comprise, for example, a local area network (LAN), wide area network (WAN) and/or storage area network (SAN). The switch 102 may also facilitate communication with other switches, e.g., switch 118, and with other networks so that local computer nodes 150, 152, 154 may communicate with any number of computer nodes over other networks.

Each computer node may function as a transmitting (source) and receiving (destination) device in order to exchange data and/or commands with each other via the switch 102 using one or more communication protocols. Such data and/or commands may be divided by the communication protocol into smaller packets of information for more efficient routing. Each packet may have a particular format and size depending, at least in part, on the particular communication protocol being utilized. The plurality of ports 180, 182, 184, 186 may be capable of receiving and transmitting a plurality of packets to the computer nodes 150, 152, 154 and other computer nodes of other networks, e.g., via switch 118 coupled to port 186. The switch 102 may be a layer 2 type switch adapted to examine each packet received and determine which computer node and/or external switch the packet is intended for. Each computer node may be identified by a Media Access Control (MAC) address, and the switch 102 may be capable of determining the appropriate address for an intended computer node and route packets to that node using one or more ports.

One exemplary communication protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard. Another communication protocol may be an X.25 communications protocol. The X.25 communication protocol may comply or be compatible with a standard promulgated by the International Telecommunication Union-Telecommunication Standardization Sector (ITU-T). Yet another communication protocol may be a frame relay communication protocol that may comply or be compatible with a standard promulgated by Consultative Committee for International Telegraph and Telephone (CCITT) and/or the American National Standards Institute (ANSI). Yet another communication protocol may be an Asynchronous Transfer Mode (ATM) communication protocol. The ATM communication protocol may comply or be compatible with an ATM standard published by the ATM Forum titled "ATM-MPLS Network Interworking 1.0" published August 2001, and/or later versions of this standard. Of course, different and/or after-developed communication protocols are equally contemplated herein.

The switch 102 may include an integrated circuit (IC) 170. IC 170 may capable, at least in part, of receiving and transmitting those packets received by the plurality of ports to appropriate computer nodes or other switches. As used herein, an "integrated circuit" or IC means a semiconductor device and/or microelectronic device, such as, for example, a semiconductor integrated circuit chip. As will be described in greater detail herein, the IC 170 may also be capable of one or more packet operations which may include, for example, address resolution, rule lookups, and traffic prioritization.

The switch 102 may also comprise memory 135. Memory 135 may be external to IC 170. Memory 135 may comprise one or more of the following types of memories: semiconductor firmware memory, programmable memory, non-volatile memory, read only memory, electrically programmable memory, random access memory, flash memory such as NAND or NOR type flash memory, magnetic disk memory, and/or optical disk memory. Machine readable firmware program instructions may be stored in memory 135. These instructions may be accessed and executed by the integrated circuit 170. When executed by the integrated circuit 170, these instructions may result in the integrated circuit 170 performing the operations described herein as being performed by the integrated circuit.

Figure 2:
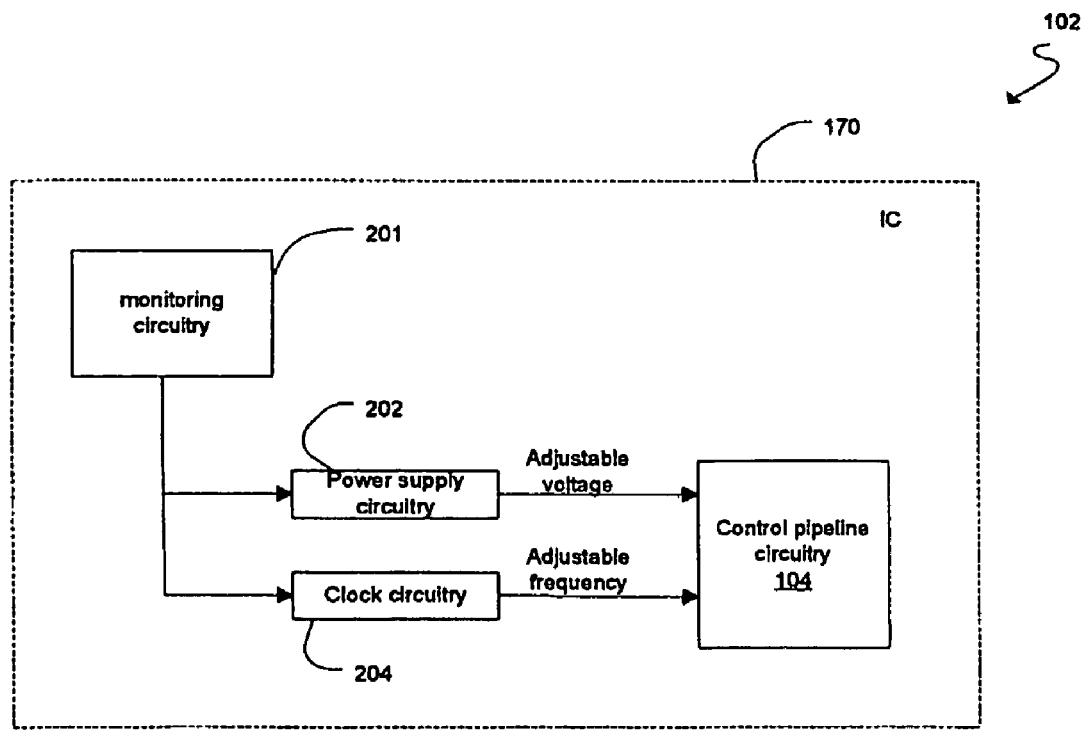
FIG. 2 is a block diagram of an integrated circuit of the switch of FIG. 1.

FIG. 2 is a block diagram of the IC 170 of the switch 102 of FIG. 1. The IC 170 may include monitoring circuitry 201, power supply circuitry 202, clock circuitry 202, and control pipeline circuitry 104. As used herein, "circuitry" may comprise, for example, singly or in any combination, hardwired circuitry, programmable circuitry, state machine circuitry, and/or firmware that stores instructions executed by programmable circuitry. The IC 170 may be configured to monitor a rate of packets received at the switch 102 and configured to adjust a power consumption of at least a part of the IC 170 in response to the rate of packets received at one or more ports of switch 102. In one embodiment, monitoring circuitry 201 may be capable of monitoring the rate of packets received at one or more ports of the switch 102, and the IC 170 may be capable of adjusting the power consumption of control pipeline circuitry 104, based on, at least in part, the rate of packets received at the switch 102. Thus, for example, the IC 170 may be configured to reduce power consumption of the control pipeline circuitry 104 of the switch in response to a relatively lower rate of received packets and to increase the power consumption of the control pipeline circuitry in response to a relatively higher rate of received packets.

The power consumption of the control pipeline circuitry 104 may be adjusted by adjusting the power supply voltage, as may be provided by power supply circuitry 202, and/or an operating frequency of the control pipeline circuitry 104, as may be determined by clock circuitry 204. The monitoring circuitry 201 may generate one or more control signals, based on, at least in part, the flow rate of packets received at one or more ports of the switch 102. One or more control signals generated by monitoring circuitry 201 may be used by power supply circuitry 202 to adjust a supply voltage provided to control pipeline circuitry 104. Alternatively, or additionally, one or more control signals generated by monitoring circuitry 201 may be used by clock circuitry 202 to adjust an operating frequency of control pipeline circuitry 104.

In general, as the rate of packets received at the switch increases, the clock circuitry 204 may respond by increasing the operating frequency of the control pipeline circuitry 104 in order to service the additional incoming packets. In contrast, if the rate of packets received at the switch decreases, the clock circuitry 204 may respond by decreasing the operating frequency of the control pipeline circuitry 104, which may operate to reduce power consumption of the switch 102. The reduced operating frequency may be selected to permit continued processing of packets received at a reduced power consumption level. Alternatively or additionally, the power supply circuitry 202 may respond to varying rates of received packets by adjusting a supply voltage level provided to the control pipeline circuitry 104 by generally increasing the voltage level in response to an increased rate of received packets and decreasing the voltage level in response to a decreased rate of received packets. The average power consumption of the switch may therefore be reduced compared to a conventional switch architecture which may provide a fixed voltage level and fixed operating frequency level high enough to accommodate the highest rate of received packets.

Figure 3:
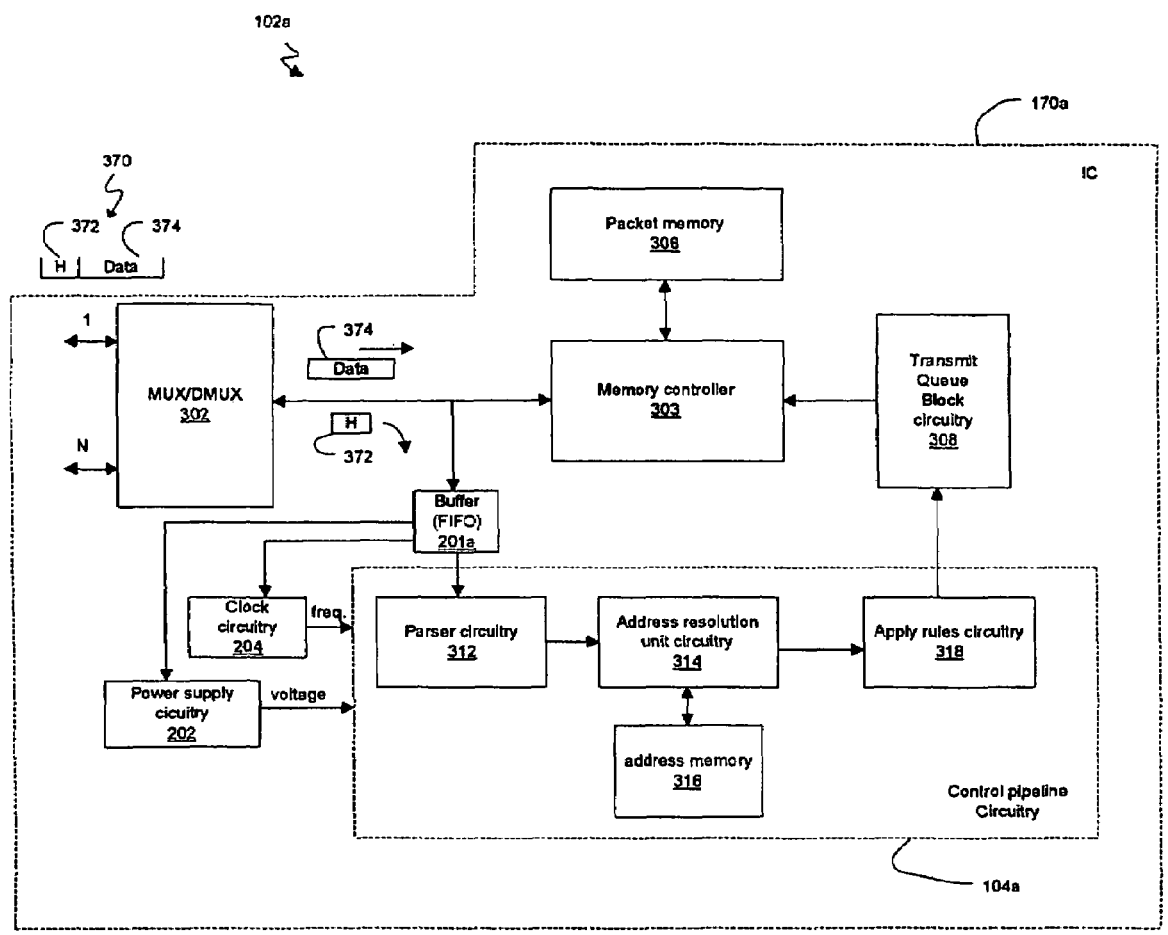
FIG. 3 is a block diagram of one embodiment of an integrated circuit consistent with the embodiment of FIG. 2.

FIG. 3 illustrates one embodiment 102a of a switch consistent with FIGS. 1 and 2. The switch 102a may also include an embodiment 170a of an IC consistent with FIGS. 1 and 2. The IC 170a may include a buffer 201a functioning as the monitoring circuitry 201 as a level of data in the buffer may be representative of the rate of packets received at the switch 102a. The IC 170a may also include a multiplexer/demultiplexer (MUX/DMUX) 302, control pipeline circuitry 104a, transmit queue block circuitry 308, memory controller 303, packet memory 306, clock circuitry 204, and power supply circuitry 202. The control pipeline circuitry 104a may further include parser circuitry 312, address resolution unit circuitry 314, address memory 316, and apply rules circuitry 318.

The switch 102a may receive a plurality of packets at the various ports e.g., ports 180, 182, 184, 186, of the switch from any of a variety of computer nodes. Only one packet 370 is illustrated in FIG. 3 for clarity. Each packet 370 may have a header portion 372 and data portion 374. The packet 370 may comply with the Ethernet communication protocol in one embodiment. The header portion 372 may include address information such as source and destination computer nodes. The data portion 374 may include any variety of data being transferred from one computer node to another.

The MUX/DMUX 302 may receive and transmit a plurality of packets from the ports of the switch 102a. A multiplexed stream including the data portion of each packet from the MUX/DMUX 302, e.g., data portion 374 from packet 370, may be written into packet memory 306 managed by the memory controller 303. The header portion of each packet, e.g., header portion 372 of packet 370, may be passed to the buffer 201. The buffer 201 may be a first-in first-out (FIFO) buffer in one embodiment. In response to a level of data in the buffer 201, the clock circuitry 204 may adjust the operating frequency of the control pipeline circuitry 104a. Also in response to the level of data in the buffer 201, the power supply circuitry 202 may adjust a voltage level provided to the control pipeline circuitry 104a.

The header portion of each received packet may then be passed from the buffer 201 to the control pipeline circuitry 104a. The control pipeline circuitry 104a may perform a variety of operations on the header of received packets. Parser circuitry 312 may parse received headers into associated fields such as source address fields and destination address fields. Address resolution unit circuitry 314 may perform associated lookups such as source, destination, and rule lookups. The address resolution unit circuitry 314 accordingly may accesses address memory 316 to perform such lookups. Apply rules circuitry 318 may apply rules that were obtained from address resolution unit circuitry 314. The apply rules circuitry 318 may also form a transmit queue entry in the transmit queue block circuitry 308 for each packet which may then by queued into the appropriate port queue with the transmit queue block circuitry 308. When a packet is being transmitted from the switch 102a, the header portion for each packet may be obtained from the transmit queue block circuitry 308 and the data portion for each packet may be obtained from packet memory 306 by memory controller 304 and transmitted out the appropriate port after applying any edit operation.

FIGS. 4A through 4D illustrate operation of one embodiment of the buffer 201a of FIG. 3 and how the clock circuitry 204 and power supply circuitry 202 may adjust the operating frequency level and voltage level provided to the control pipeline circuitry 104a in response to a data level in the buffer 201a. The buffer 201a may have a low threshold level 402 and a high threshold level 404, where the high threshold level 404 is greater than the low threshold level 402.

Figure 4A:
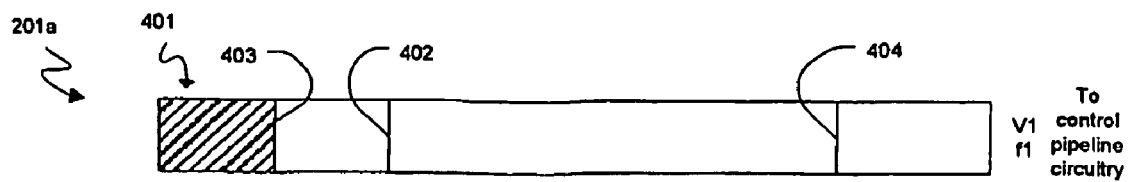
FIGS. 4A-4D are diagrams of the buffer of the switch of FIG. 3 having differing levels of data relative to high and low threshold levels of the buffer.

FIG. 4A illustrates a starting position where data 401, e.g., headers from received packets at the switch, in the buffer 201a is at a level 403 less than the low threshold level 402. Initially, the voltage level provided by the power supply circuitry 202 may be set to an initial voltage level V1 and the frequency level provided by the clock circuitry 204 may be set to an initial frequency level f1. The initial voltage level V1 and initial frequency level f1 may be chosen to allow the control pipeline circuitry 104a to support an average rate of received packets. For example, if the communication protocol is an Ethernet communication protocol the smallest sized packet may be about 64 bytes and an average packet size may be about 128 bytes. Hence, the initial V1 and f1 values may be chosen to support an average packet arrival rate or header rate of a new packet every 128 bytes in this embodiment. The low threshold level 402 may be programmable to different values depending, at least in part, on the size of the expected packets to be received at the switch.

The data 401 in the buffer 201a may increase above the level 403 illustrated in FIG. 4A if the rate of received packets at the switch increases. For example, if V1 and f1 are chosen to support an average packet arrival rate and the packet arrival rate increases above this level, the level of the data 401 would start to increase. This may occur if the average packet arrival rate is a new packet every 128 bytes and the switch receives a burst of smaller sized packets every 64 bytes.

Figure 4B:
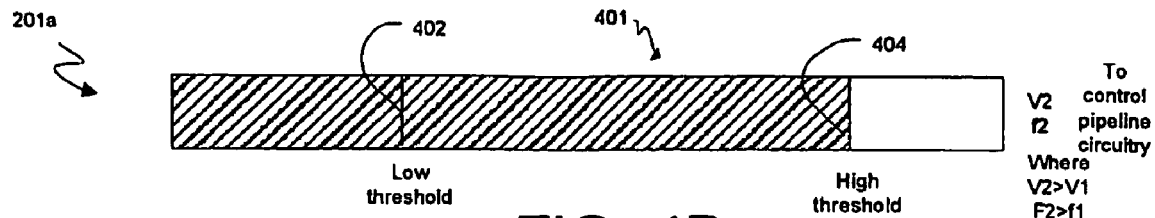

FIG. 4B illustrates the level of data 401 may increase to a level greater than or equal to the high threshold level 404. Once the level of the data in the buffer increases to level greater than or equal to the high threshold level 404, the power supply circuitry 202 may adjust the voltage level to the control pipeline circuitry 104a to voltage level V2, where V2 is greater than V1. In one embodiment, the voltage level V2 may be chosen to support the maximum rate of received packets possible at the switch, e.g., a maximum header rate of 64 bytes in one embodiment. In addition, the clock circuitry 204 may adjust the operating frequency to f2, where f2 is greater than f1. In one embodiment, the frequency level f2 may also be chosen to support the maximum rate of received packets possible at the switch.

Figure 4C:
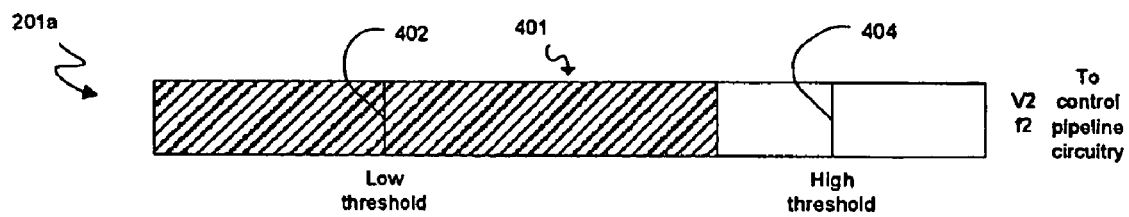
Figure 4D:
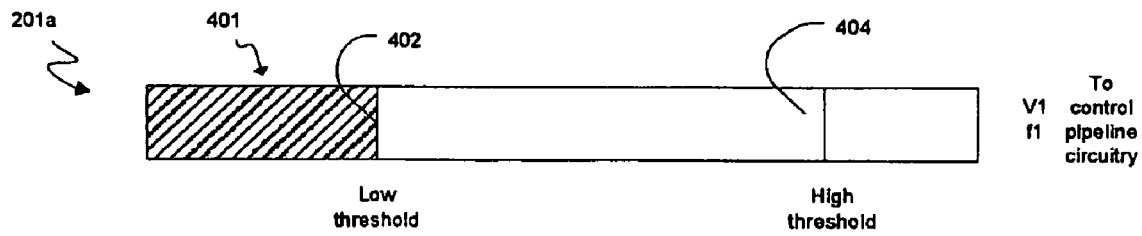

FIG. 4C illustrates the data 401 in the buffer has decreased from its level in FIG. 4B. The control pipeline circuitry 104a may continue to operate at the higher V2 and f2 levels until the data 401 in the buffer decreases to a level less than or equal to the low threshold level 402 as illustrated in FIG. 4D. At this point in time, the power supply circuitry 202 and clock circuitry 204 may adjust the V2 and f2 levels back to V1 and f1 levels respectively. The process may continue as the control pipeline circuitry 104a may not operate at the higher V2 and f1 levels unless the data level in the buffer is greater than or equal to the high threshold level 404.

Both the low threshold level 402 and the high threshold level 404 may be programmable and selected based, at least in part, on the expected size of packets to be received at the switch. The high threshold level 404 may be selected such that the probability of the data reaching the high threshold level 404 may be low, e.g., it may only occur during a sustained burst of the smallest sized packets at all ports of the switch simultaneously. In this way, the average power dissipation of the switch may trend towards the power dissipated at the V1 and f1 values yet may still have flexibility to accommodate maximum packet arrival rates. Although only two threshold levels (low threshold 402 and high threshold 404) are illustrated, additional threshold levels with associated voltage and operating frequency levels for additional control may be utilized.

Figure 5:
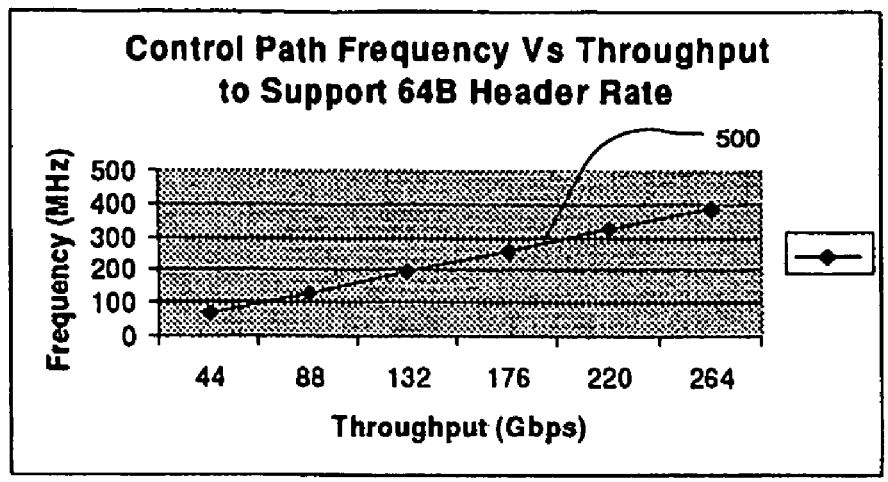
FIG. 5 is a plot of throughput versus frequency to support a 64 byte header rate.

FIG. 5 illustrates a plot 500 of frequency in megahertz (MHz) versus a maximum throughput rate of an associated switch in gigabits per second (Gb/s). The maximum throughput rate may be based on the number and speed of various ports of the switch. For instance, if the switch has 24-1 Gb/s ports and 2-10 Gb/s ports the maximum throughput may be 44 Gb/s. The maximum throughput ranges from 44 to 264 Gb/s on the plot 500 of FIG. 5. This maximum throughput rate may then be converted to a maximum packet arrival rate based on an assumed size of the packets. At an assumed packet size of only 64 bytes for an Ethernet switch, FIG. 5 illustrates the frequency that should be maintained to support the throughput with such 64 byte packet sizes. In general, as illustrated by plot 500 the frequency level required to support increasing throughput rates also rises relatively linearly with the increased throughput rate.

Figure 6:
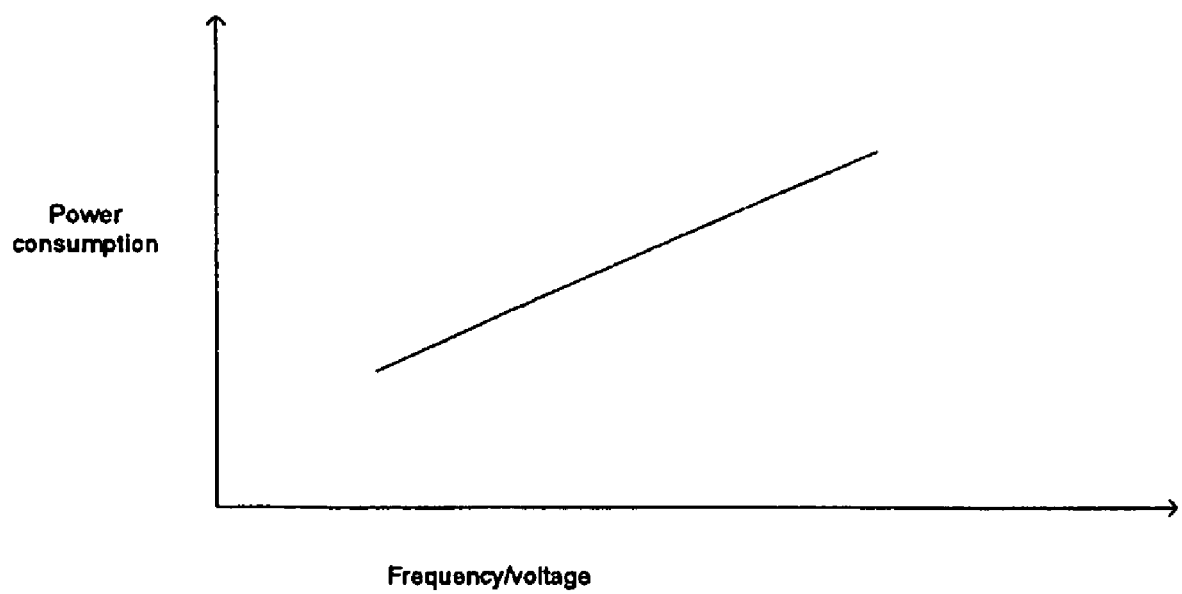
FIG. 6 is a plot of frequency and voltage versus power consumption.

FIG. 6 is a plot of frequency and voltage versus power consumption of an associated switch. In general, as the operating frequency of the control pipeline circuitry 104a increases so does the power consumption of the switch. This increase in power consumption may be caused by toggling of internal circuitry. Even if some internal circuitry does not toggle, power consumption may increase with increasing frequency levels since clock tree buffers and some circuitry inside flip flops and logic gates may keep toggling hence consuming power. In addition, power consumption is also increased as the voltage level to the control pipeline circuitry increases.

Figure 7:
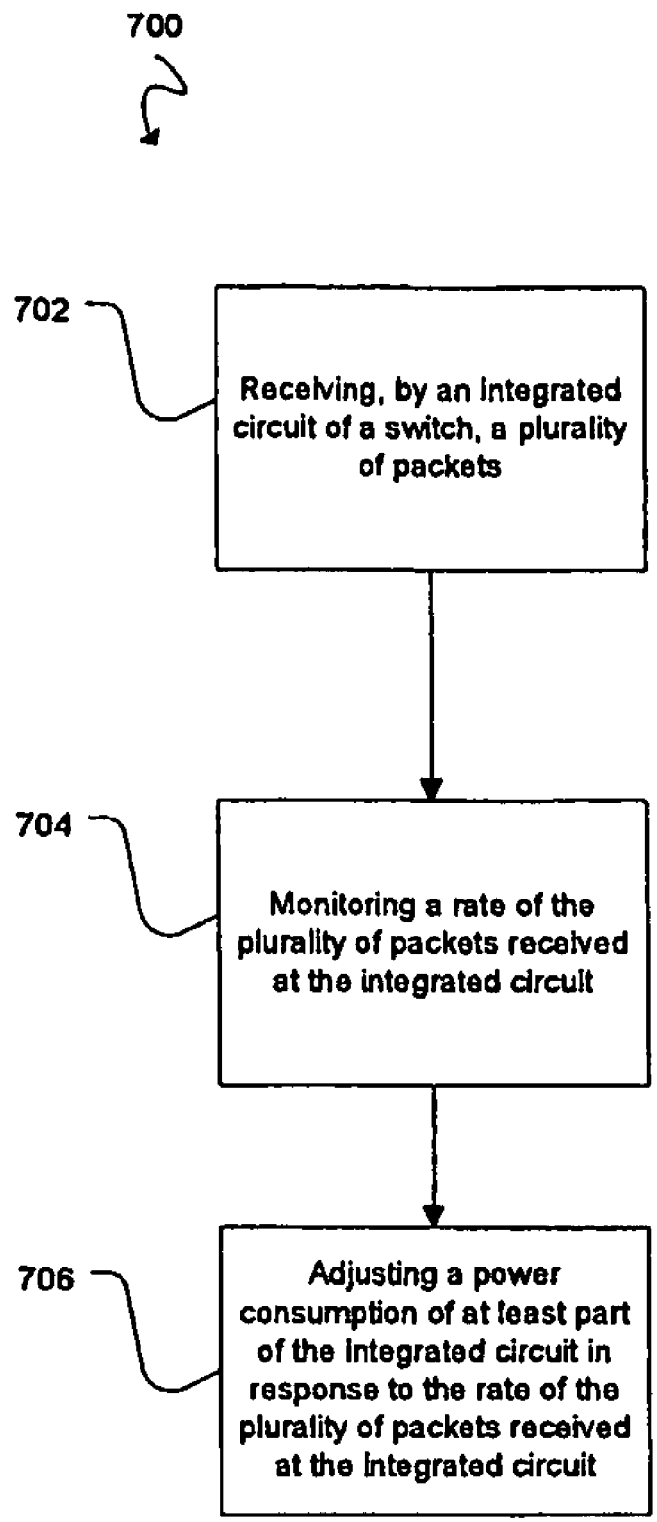
FIG. 7 is a flow chart illustrating operations that may be performed according to an embodiment.

FIG. 7 is a flow chart of operations 700 consistent with an embodiment. Operation 702 may include receiving, by an integrated circuit of a switch, a plurality of packets. Operation 704 may include monitoring a rate of the plurality of packets received at the integrated circuit. Finally, operation 706 may include adjusting a power consumption of at least a part of the integrated circuit in response to the rate of the plurality of packets received at the integrated circuit.

It will be appreciated that the functionality described for all the embodiments described herein, may be implemented using hardware, firmware, software, or a combination thereof.

Thus, in summary, one embodiment may comprise an article. The article may comprise a storage medium having stored therein instructions that when executed by a machine result in the following: monitoring a rate of a plurality of packets received at an integrated circuit of a switch; and adjusting a power consumption of at least a part of the integrated circuit in response to the rate of the plurality of packets-received at the integrated circuit.

Another embodiment may comprise a switch. The switch may comprise a plurality of ports configured to receive a plurality of packets, and monitoring circuitry configured to monitor a rate of the plurality of packets received at an integrated circuit of the switch. The integrated circuit may be configured to adjust a power consumption of at least part of the integrated circuit in response to the rate of the plurality of packets received at the integrated circuit.

In another embodiment, a switch may include a plurality of ports configured to receive a plurality of packets, each of the plurality of packets including a header and data portion, each of the plurality of packets complying with an Ethernet communication protocol. The switch may also include control pipeline circuitry configured to perform operations in response to at least one header of the plurality of packets. The switch may also include a buffer coupled to an input of the control pipeline circuitry, the buffer configured to accept each header of each of the plurality of packets. The switch may also include clock circuitry configured to adjust an operating frequency of the control pipeline circuitry in response to a level of data in the buffer, the level of the data in the buffer representative of a rate of the plurality of packets received at the switch. Finally, the switch may include power supply circuitry configured to adjust a supply voltage level of the control pipeline circuitry in response to the level of data in the buffer.

In yet another embodiment, a switch may comprise a plurality of ports configured to receive a plurality of packets, each of the plurality of packets including a header and data portion, each of the plurality of packets complying with an Ethernet communication protocol. The switch may also comprise an integrated circuit. The integrated circuit may comprise control pipeline circuitry configured to perform operations in response to at least one header of the plurality of packets. The integrated circuit may further comprise a buffer coupled to an input of the control pipeline circuitry, the buffer configured to accept each header of each of the plurality of packets. The integrated circuit may further comprise clock circuitry configured to adjust an operating frequency of the control pipeline circuitry in response to a level of data in the buffers the level of the data in the buffer representative of a rate of the plurality of packets received at the switch. The integrated circuit may further comprise power supply circuitry configured to adjust a supply voltage level of the control pipeline circuitry in response to the level of data in the buffer. The switch may also comprise flash memory coupled to the integrated circuit and comprising at least one instruction that is executed by the integrated circuit.

In these embodiments, the power consumption of the switch may be reduced compared to conventional switch architectures having a constant power consumption designed to accommodate a maximum packet arrival rate. In addition, the switch may have flexibility to accommodate varying packet arrival rates including a maximum packet arrival rate. The average power consumption of the switch may therefore be reduced without sacrificing the ability of the switch to accommodate a maximum packet arrival rate of packets at each port of the switch.

For an Ethernet switch, the operating frequency of the control pipeline circuitry may be initially set at an initial level to handle an average expected packet arrival rate, e.g., one packet every 128 bytes. If a burst of smaller sized packets on each port of the switch occurs, e.g., one packet every 64 bytes, the switch may be able to sense this condition and increase the operating frequency to a higher frequency level to process the increased volume of packets. In addition, the supply voltage level may similarly be set to an initial voltage level and be increased to a higher supply voltage level during this condition.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method comprising:
   receiving, by an integrated circuit of a switch, a plurality of packets;
   monitoring a rate of said plurality of packets received at said integrated circuit; and
   adjusting a power consumption of at least a part of said integrated circuit in response to said rate of said plurality of packets received at said integrated circuit;
   wherein said part of said integrated circuit comprises control pipeline circuitry, wherein said adjusting said power consumption comprises adjusting an operating frequency and a supply voltage of said control pipeline circuitry of said integrated circuit, wherein said rate of said plurality of packets received at said integrated circuit is determined by a level of data in a buffer, said buffer storing at least a portion of each of said plurality of packets, and said method further comprises:
   setting a first operating frequency of said control pipeline circuitry;
   setting a first voltage level of said control pipeline circuitry;
   adjusting said first operating frequency to a second operating frequency if said level of said data in said buffer is greater than or equal to a high threshold level, said second operating frequency greater than said first operating frequency; and
   adjusting said first voltage level to a second voltage level if said level of said data in said buffer is greater than or equal to said high threshold level, said second voltage level greater than said first voltage level.

2. The method of claim 1, wherein said adjusting said power consumption comprises adjusting an operating frequency of said part of said integrated circuit.

3. The method of claim 1, wherein said adjusting said power consumption comprises adjusting a supply voltage of said part of said integrated circuit.

4. The method of claim 1, wherein said rate of said plurality of packets received at said integrated circuit is determined by a level of data in a buffer, said buffer storing at least a portion of each of said plurality of packets.

5. The method of claim 1, further comprising:
   adjusting said second operating frequency to said first operating frequency if said level of said data in said buffer is reduced to a level less than or equal to a low threshold level, said low threshold level less than said high threshold level; and
   adjusting said second voltage level to said first voltage level if said level of said data in said buffer is reduced to said level less than or equal to a low threshold level if said level of said data is less than or equal to said low threshold level.

6. An article comprising:
   a computer-readable medium encoded with computer executable instructions that when executed by a computer results in the following:
   monitoring a rate of a plurality of packets received at an integrated circuit of a switch; and
   adjusting a power consumption of at least a part of said integrated circuit in response to said rate of said plurality of packets received at said integrated circuit;
   wherein said part of said integrated circuit comprises control pipeline circuitry, wherein said adjusting said power consumption comprises adjusting an operating frequency and a supply voltage of said control pipeline circuitry of said integrated circuit, wherein said rate of said plurality of packets received at said integrated circuit is determined by a level of data in a buffer, said buffer storing at least a portion of each of said plurality of packets, and wherein said instructions that when executed by said computer also result in:
   setting a first operating frequency of said control pipeline circuitry;
   setting a first voltage level of said control pipeline circuitry;

adjusting said first operating frequency to a second operating frequency if said level of said data in said buffer is greater than or equal to a high threshold level, said second operating frequency greater than said first operating frequency; and adjusting said first voltage level to a second voltage level if said level of said data in said buffer is greater than or equal to said high threshold level, said second voltage level greater than said first voltage level.

7. The article of claim 6, wherein said adjusting said power consumption comprises adjusting an operating frequency of said part of said integrated circuit.

8. The article of claim 6, wherein said adjusting said power consumption comprises adjusting a supply voltage of said part of said integrated circuit.

9. The article of claim 6, wherein said rate of said plurality of packets received at said integrated circuit is determined by a level of data in a buffer, said buffer storing at least a portion of each of said plurality of packets.

10. The article of claim 6, wherein said instructions that when executed by said machine also result in:

adjusting said second operating frequency to said first operating frequency if said level of said data in said buffer is reduced to a level less than or equal to a low threshold level, said low threshold level less than said high threshold level; and adjusting said second voltage level to said first voltage level if said level of said data in said buffer is reduced to said level less than or equal to a low threshold level if said level of said data is less than or equal to said low threshold level.

11. A switch comprising:

a plurality of ports configured to receive a plurality of packets; and monitoring circuitry configured to monitor a rate of said plurality of packets received at an integrated circuit of said switch, said integrated circuit configured to adjust a power consumption of at least part of said integrated circuit in response to said rate of said plurality of packets received at said integrated circuit;

wherein said part of said integrated circuit comprises control pipeline circuitry, wherein said integrated circuit adjusts an operating frequency and a supply voltage of said control pipeline circuitry, and wherein said monitoring circuitry comprises a buffer, said buffer configured to store at least a portion of each of said plurality of packets and wherein a level of data in said buffer is representative of said rate of said plurality of packets received at said integrated circuit.

12. The switch of claim 11, wherein said integrated circuit adjusts an operating frequency of said part of said integrated circuit to adjust said power consumption.

13. The switch of claim 11, wherein said integrated circuit adjusts a supply voltage of said part of said integrated circuit to adjust said power consumption.

14. A switch comprising:

a plurality of ports configured to receive a plurality of packets, each said plurality of packets including a header and data portion, each said plurality of packets complying with an Ethernet communication protocol;

control pipeline circuitry configured to perform operations in response to at least one header of said plurality of packets;

a buffer coupled to an input of said control pipeline circuitry, said buffer configured to accept each said header of each said plurality of packets;

clock circuitry configured to adjust an operating frequency of said control pipeline circuitry in response to a level of data in said buffer, said level of said data in said buffer representative of a rate of said plurality of packets received at said switch; and power supply circuitry configured to adjust a supply voltage level of said control pipeline circuitry in response to said level of data in said buffer;

wherein said clock circuitry is further configured to set a first operating frequency of said control pipeline circuitry and said power supply circuitry is further configured to set a first voltage supply level to said to control pipeline circuitry, and wherein said clock circuitry is further configured to adjust said first operating frequency to a second operating frequency if said level of said data in said buffer is greater than or equal to a high threshold level, said second operating frequency greater than said first operating frequency, and wherein said power supply circuitry is further configured to adjust said first voltage supply level to a second voltage supply level if said level of said data in said buffer is greater than or equal to said high threshold level, said second voltage supply level greater than said first voltage supply level.

15. The switch of claim 14, wherein said clock circuitry further is further configured to adjust said second operating frequency to said first operating frequency if said level of said data in said buffer is reduced to a level less than or equal to a low threshold level, said low threshold level less than said high threshold level, and wherein said power supply circuitry is further configured to adjust said second voltage supply level to said first voltage supply level if said level of said data in said buffer is reduced to said level less than or equal to said low threshold level.

16. A switch comprising:

a plurality of ports configured to receive a plurality of packets, each said plurality of packets including a header and data portion, each said plurality of packets complying with an Ethernet communication protocol;

an integrated circuit comprising:

control pipeline circuitry configured to perform operations in response to at least one header of said plurality of packets;

a buffer coupled to an input of said control pipeline circuitry, said buffer configured to accept each said header of each said plurality of packets;

clock circuitry configured to adjust an operating frequency of said control pipeline circuitry in response to a level of data in said buffer, said level of said data in said buffer representative of a rate of said plurality of packets received at said switch;

power supply circuitry configured to adjust a supply voltage level of said control pipeline circuitry in response to said level of data in said buffer; and flash memory coupled to said integrated circuit and comprising at least one instruction that is executed by said integrated circuit;

wherein said clock circuitry is further configured to set a first operating frequency of said control pipeline circuitry and said power supply circuitry is further configured to set a first voltage supply level to said to control pipeline circuitry, and wherein said clock circuitry is further configured to adjust said first operating frequency to a second operating frequency if said level of said data in said buffer is greater than or equal to a high threshold level, said second operating frequency greater than said first operating frequency, and wherein said power supply circuitry is further configured to adjust said first voltage supply level to a second voltage supply level if said level of said data in said buffer is greater than or equal to said high threshold level, said second voltage supply level greater than said first voltage supply level.

17. The switch of claim 16, wherein said clock circuitry further is further configured to adjust said second operating frequency to said first operating frequency if said level of said data in said buffer is reduced to a level less than or equal to a low threshold level, said low threshold level less than said high threshold level, and wherein said power supply circuitry is further configured to adjust said second voltage supply level to said first voltage supply level if said level of said data in said buffer is reduced to said level less than or equal to said low threshold level.

* * * * *